Dec. 7, 1965 P. L. E. M. LAMORT 3,221,886
BACKWASH FILTER WITH FILTRATE DEFLECTOR
Filed Nov. 4, 1963 3 Sheets-Sheet 1

Inventor
Pierre Louis Emile Marie Lamort
by Michael J. Striker

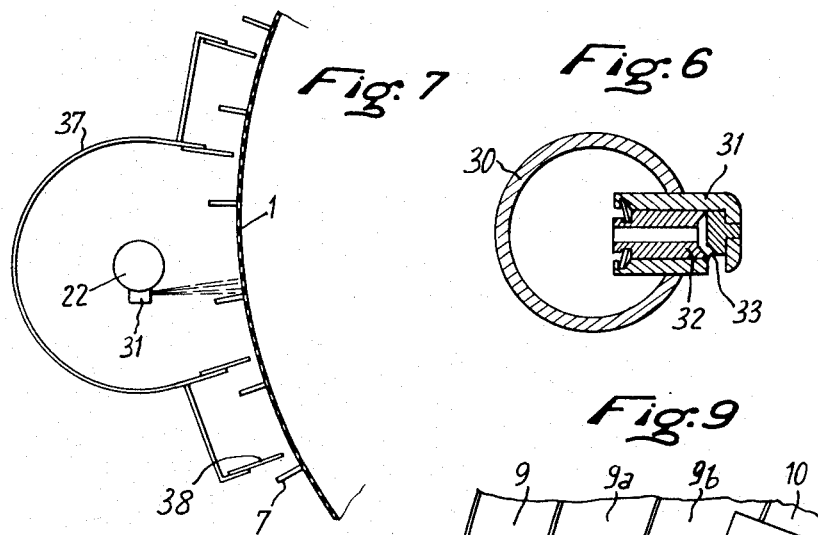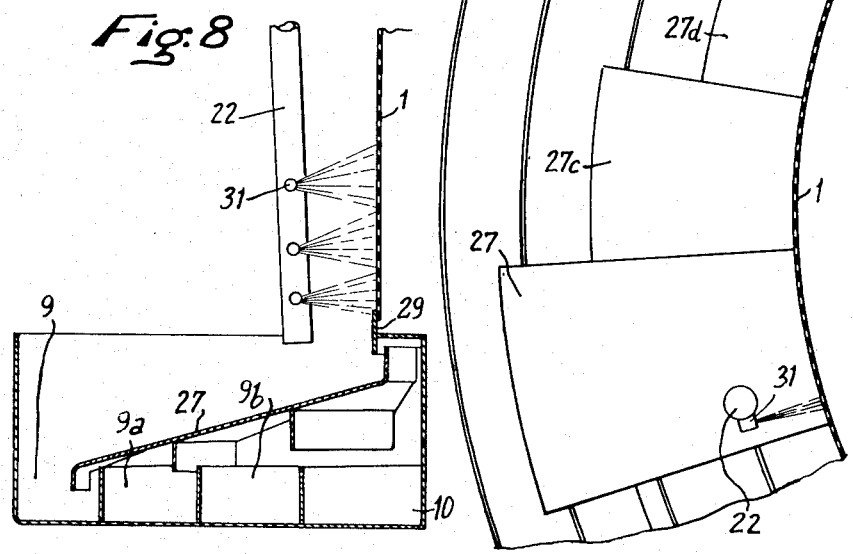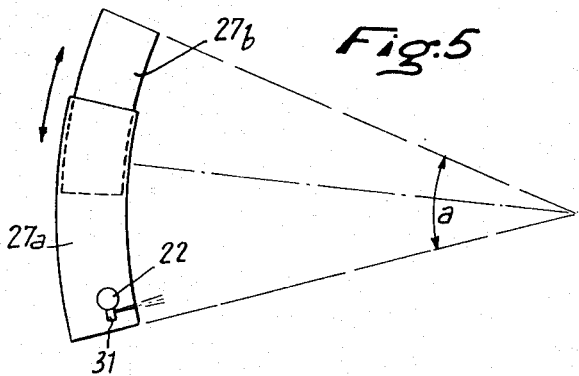

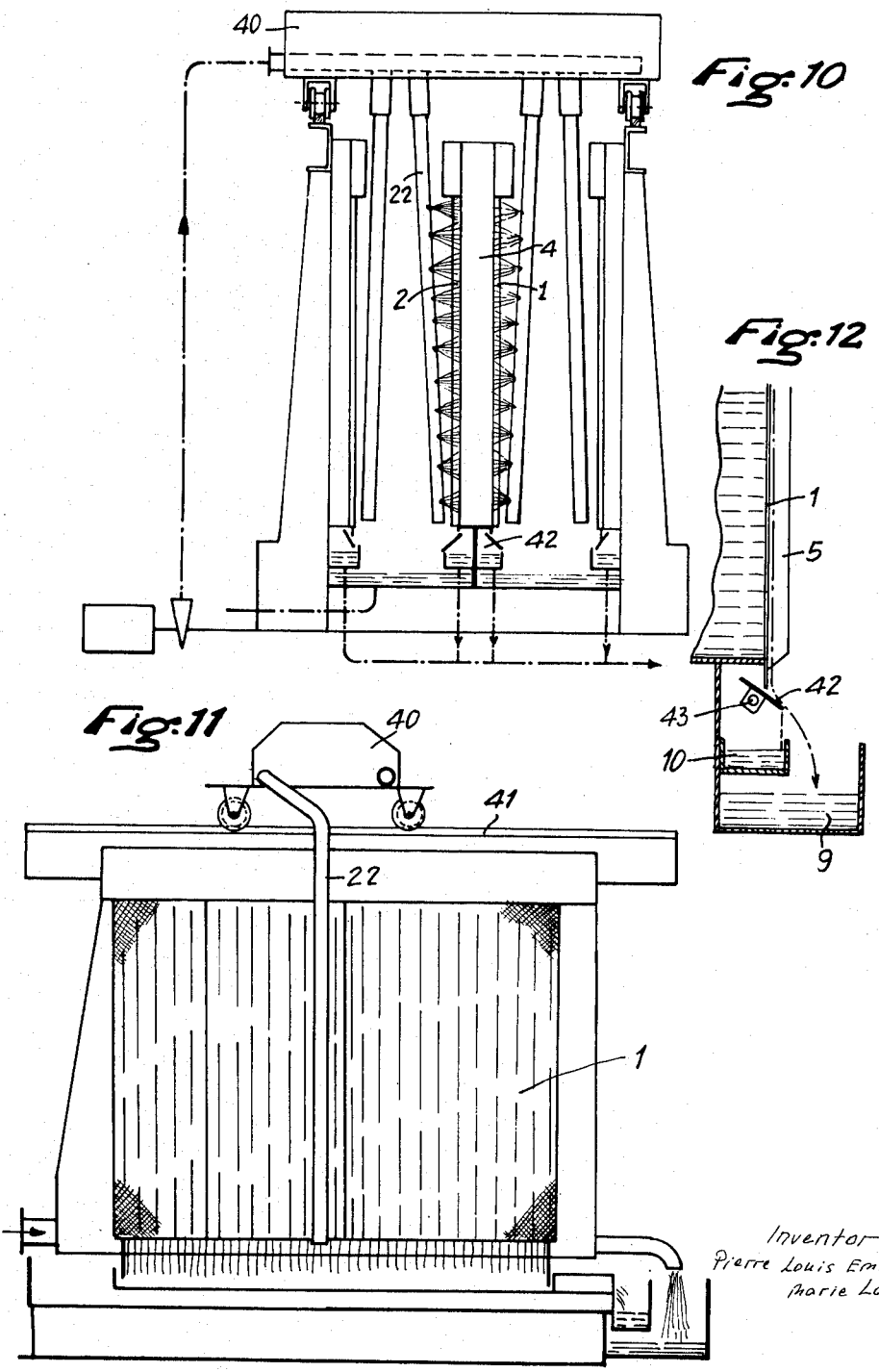

United States Patent Office 3,221,886
Patented Dec. 7, 1965

3,221,886
BACKWASH FILTER WITH FILTRATE
DEFLECTOR
Pierre Louis Emile Marie Lamort, Vitry-le-Francois,
France, assignor to E & M. Lamort Fils, Marne, France,
an anonymous society of France
Filed Nov. 4, 1963, Ser. No. 321,110
19 Claims. (Cl. 210—298)

The present invention relates to apparatus for the filtration of liquids containing solid, fine particles in suspension and notably for the filtration of residual liquors in paper making, wherein the liquid passes through a filtering wall and wherein the layer of solid particles deposited on the face of entry of the liquid through the filtering wall is detached by a fluid projected by a rinsing device after having passed through the said filtering wall.

Contrary to known apparatus of this type and according to the present invention, the liquid passes from the interior towards the exterior of the filtering wall (the latter is fixed and the rinsing device is displaceable) the clear filtrates being evacuated through a first conduit arranged below the said walls and a deflector returning the turbid filtrate to a second conduit extending parallel to the first conduit.

Purely by way of example, the accompanying drawings show in diagrammatic form a plurality of embodiments of the present invention.

FIGURE 5 is a plan view of the deflector of the present apparatus.

FIGURES 6 and 7 are sections drawn to a large scale along the line VII—VII of FIGURE 1.

FIGURE 8 is a section drawn to a larger scale of a variant of a portion of the apparatus illustrated in FIGURES 1 to 7.

FIGURE 9 is an underneath view of this variant.

FIGURE 10 is a cross-section through a second apparatus according to the present invention.

FIGURE 11 is a lateral view of the said second apparatus, and

FIGURE 12 is a view drawn to a large scale of a portion of the said second apparatus.

Figure 1:
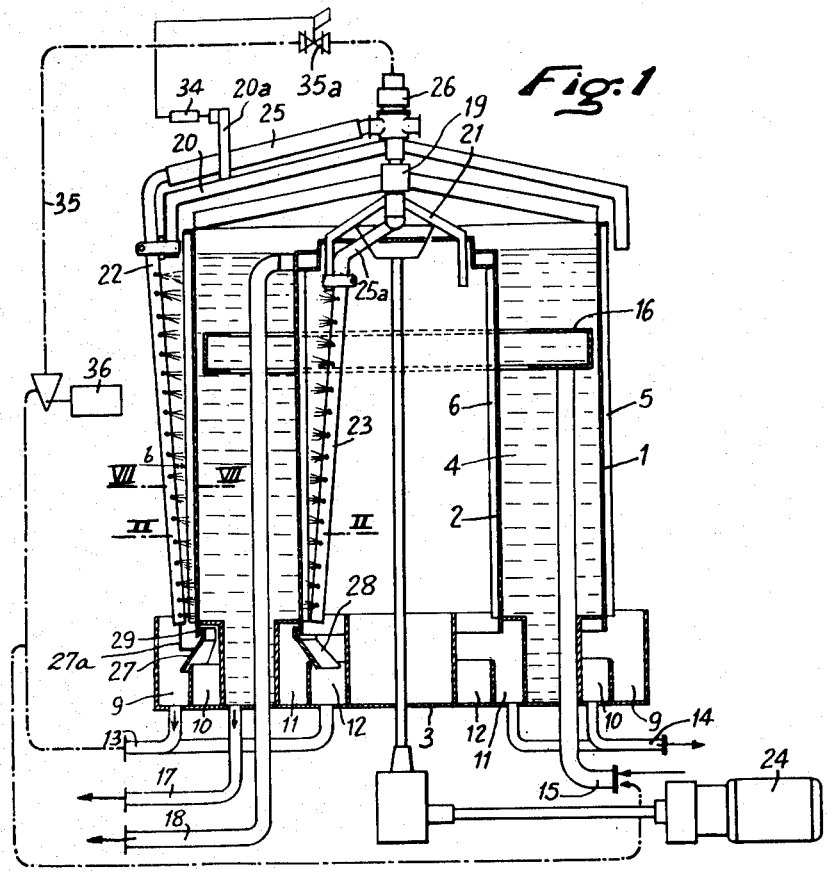
FIGURE 1 is a diagrammatic axial section through a first apparatus according to the present invention.
Figure 2:
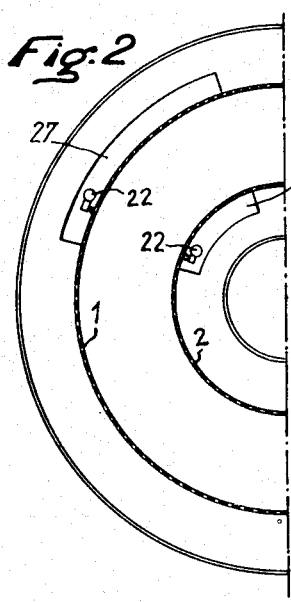
FIGURE 2 is a section along the line II—II of FIGURE 1.

The apparatus illustrated notably in FIGURES 1 and 2 comprises two vertical cylinders 1 and 2 which are concentric and which bear on a base 3 in such manner that they delimit between them an annular chamber 4.

Figure 3:
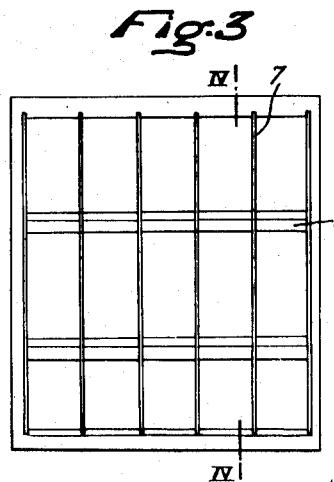
FIGURE 3 is a developed view of the filtering surfaces of the said apparatus.
Figure 4:
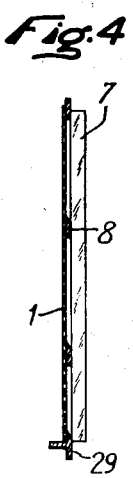
FIGURE 4 is a section along the line IV—IV of FIGURE 3.

The walls of the cylinders 1 and 2 comprise metal frames 5 and 6 supporting a filtering fabric such as for example a metal gauze. The frames 5 and 6 consist of vertical bars 7 (FIGURES 3 and 4) joined by horizontal bars 8 the thickness of which is less than that of the bars 7 and the upper edge of which is bevelled.

The base 3 forms the bottom of the chamber 4 and delimits on either side thereof four annular conduits 9, 10, 11 and 12.

The conduits 9 and 12 have a common evacuation pipe system 13 and the conduits 10 and 11 have a common evacuation pipe system 14.

The liquid to be filtered penetrates into the chamber 4 through a pipe system 15 arranged half way up the chamber 4 and through a vertically displaceable channel deflector 16.

The chamber 4 has furthermore two evacuation apertures, one in its lower portion 17 and the other in its upper portion 18.

A vertical shaft 19 carries arms 20 and 21 supporting rinsing tubes 22 and 23 provided with rinsing orifices over the entire height of the filters 1 and 2. The arms and the rinsers form mobile apparatus rotating about the pivot of the shaft 19, entrained by an adjustable speed control means 24.

The shaft 19 is hollow and is connected to the rinsing means 22 and 23 by conduits 25 and 25a. A rotating packing 26 permits the supplying to the rinsing means 22 and 23 of a fluid under pressure during the rotation of the mobile apparatus.

The rinsing tubes 22 and 23 support respectively, by means of any desired connecting means such as 27a, deflectors 27 and 28 which consequently rotate with them and which cover the conduits 10 and 11 over an adjustable angle a to the rear of the rinsing means 22 and 23 and in the direction of rotation thereof (FIGURE 5). To permit the variation of the angle a, the plates 27 and 28 each consist of two elements 27a and 27b (FIGURE 5) which are able to slide relatively to each other.

The frames 5 and 6 which support the filtering fabric 1 or 2 terminate in their lower portion in an edge 29 forming a water droplet (FIGURE 1) and under which the raised edge of the plates 27 and 28 is disposed.

The rinsing means 22 and 23 consist of a tube 30 (FIGURES 6 and 7) mounted on which are nozzles 31. The said nozzles are so designed and arranged that the fluid under pressure discharged therefrom forms a sheet-like jet and the different jets overlap in such manner as to form together a continuous rinsing liquid sheet. Furthermore, the nozzles 31 are of the automatic-cleaning type, i.e. a sudden interruption of the fluid pressure brings about, due to the recoil of a piston 32, the wide opening of the orifice 33 and consequently the cleaning thereof (FIGURE 6).

This type of rinsing means has already long been used in the paper industry and is not an original feature according to the present invention, but the utilisation thereof facilitates the correct functioning of the present apparatus.

The moving arm 20 carries a cam 20a which, with each revolution, actuates a contact 34 to bring about the instantaneous closing of a valve 35a disposed on a conduit 35 feeding the rinsing means 22 and 23. The latter are thus cleaned with each revolution of the moving apparatus.

The tubes of the rinsing means 22 and 23 are not parallel to the walls of the cylinders 1 and 2, but form therewith an angle b (FIGURE 1) the purpose of which will be disclosed later; the nozzles 31 are not equidistant, but are disposed on the tubes 30 in such manner that the jets of fluid discharged in fan-like manner overlap on the wall of the cylinders 1 and 2.

The mode of operation of the device is as follows:

The liquid to be filtered is introduced into the chamber 4 through the tube system 15. The deflector 16 imparts thereto a slight movement of rotation which distributes it uniformly in the chamber 4 and prevents the formation of stagnant spaces therein. The liquid filters through filtering walls 1, 2 supported by the frames 5 and 6, trickles along the outer faces of the said walls 1 and 2 and drops into the conduits 10 and 11 formed in the base 3 and below the walls 1 and 2.

A portion of the substances in suspension in the liquid is retained from the commencement of filtration by filterings walls 1 and 2 and progressively forms a layer on the inner face thereof. Thus, this layer rapidly constitutes a filtering element which is much finer and much more effective than the walls 1 and 2 themselves which thus now only serve as a support. The more the filtration advances, the clearer does the filtrate become but the less does its flow rate become. Without the rinsing means 22 and 23, the latter would drop relatively rapidly to a volume practically equal to zero, but due to the regular rotation of the said rinsing means each generatrix of the cylinders 1 and 2 is periodically subjected to the jets of fluid discharged from the nozzles 31. These jets pass through the filtering walls 1, 2 from the exterior towards the interior, thus cleaning the said walls in counterflow and destroying the filtering layer which has accumulated on their inner faces.

Thus, after each passage of the rinsing means 22, 23 along the generatrices, the filtering process is resumed as in the initial stage. Immediately after the passage of the rinsing means 22, 23 opposite the generatrices the filtrate is turbid, since the filtering layer has not yet sufficiently re-formed. This insufficiently clear filtrate trickles along the vertical walls of the walls 1 and 2 and drops on to the plates 27 and 28 which direct it towards the conduits 9 and 12, from which it is evacuated through the conduit 13.

This insufficiently clear filtrate is returned to the chamber 4 through the tube system 15 with the liquid to be filtered. At the end of a certain period of time, when the filtrate has become sufficiently clear, due to the formation of the filtering layer, the plates 27 and 28, entrained by the rotary movement of the rinsing means, are retracted and uncover the conduits 10 and 11 in which the clear filtrate drops and from which it is evacuated by the tube system 14.

It will be clear that, by adjusting the speed of rotation of the rinsing means 22 and 23 and the angle $a$ formed by the plates 27 and 28, it will be possible to modify at will the proportion of the turbid filtrates and clear filtrates and, in particular, to obtain clear filtrates which are as clear as may be desired.

The solid substances retained in suspension in the chamber 4 are in general of three kinds:

(a) Heavy substances which decant and which are evacuated through the tube system 17, either in continuous flow or by periodical purging;

(b) Light substances which float and are evacuated through the tube system 18;

(c) Substances which have almost the density of the liquid and which remain in indifferent equilibrium.

The latter are evacuated due to the following phenomenon. The jets of the rinsing means 22 and 23 entrain air which is projected in fine bubbles into the suspension contained in chamber 4; these fine bubbles tend to adhere to the solid particles which they entrain upwardly for evacuation through the tube system 18.

The rinsing means 22 and 23 are fed by a high-pressure pump 36, with a portion of the turbid filtrate leaving the tube system 13 (the excess of the said filtrate returns into the chamber 4).

In this case, the apparatus is self-sufficing, requiring no addition of external fluid. The rinsing means 22 and 23 being fed with a turbid fluid, it is more advisable to use automatic-cleaning nozzles and also a device providing for this cleaning once per revolution of the moving apparatus (device described hereinabove and comprising the contact-maker 34 and the valve 35a).

The jets of the rinsing means 22, 23, in order to provide for the cleaning of the filtering walls 1 and 2, have to overcome the static pressure obtaining in the chamber 4. It is obvious that this pressure is not the same at the top and at the foot of this chamber; it is for this reason that the rinsing means 22 and 23 are inclined at an angle $b$ relatively to the vertical; in this way a rinsing action is achieved which is practically uniformly effective over the entire height of the chamber 4.

In order to obtain an extremely clear final filtrate, it is indispensable that the separation from the turbid filtrate should be complete and it is for this reason that the frames 5 and 6 consist of vertical bars 7 delimiting on the filtering walls 1 and 2 a species of vertical passages which are relatively narrow, thus preventing the trickling of the filtrate from taking place in the form of helical trickles or jets following the filaments of the fabric constituting these walls; this can happen if precautions are not taken in the design of the support frames 5 and it would of course prevent the achievement of clear separation of the filtrates. It is for the same reason that the horizontal bars 8 are thinner than the bars 7 and that their upper edge is bevelled; in this manner, the filtrate is not able to follow a horizontal path during its passage on the bars 8.

Still with a view to preventing any risk of mixing of turbid filtrate with clear filtrate, the rinsing means 22 and 23 are provided with a hooding preventing spattering. As can be seen from FIGURE 7, the hood 37 is provided with four flexible lips 38 the spacing of which is rather greater than that obtaining between two consecutive bars 7 and which bend with each passage over the bars 7.

According to an additional provision (where necessary) a control relationship is provided between the level in the chamber 4 and the speed of rotation of the mobile apparatus, in such manner as to keep the level constant if there should be any variation in the flow rate of the fluid to be filtered.

According to a further provision if it is desired to obtain filtrates of different clarity, arrangements are made to permit the interposition of supplementary circular conduits 9a, 9b between the conduits 9 and 10 and between the conduits 11 and 12, the plates 27 and 28 then consisting of stepped elements 27c and 27d as shown in FIGURE 9. By adjusting the length of the various steps 27c and 27d of the plates 27 and 28, the desired shades of difference in the different filtrates can readily be obtained.

The advantages of the invention are notably as follows:

The principle of layer filtration, formed by the elements of the suspension to be filtered, is known but this principle is generally applied with the aid of appliances wherein the filtering wall is supported by a horizontal-pivot rotary drum. In other words, in these appliances the filtering surface is mobile and the cleaning member (generally a rinser fed with a clean external fluid) is fixed. In order to achieve a high-capacity filtration with obtaining of an extremely clear filtrate, it is necessary to have a large filtering surface and this rapidly becomes complicated and costly with apparatus having a mobile filtering surface. On the other hand, in this type of apparatus, perfect separation of the filtrates is in general difficult to achieve, since the mobile surface always entrains a certain quantity of turbid filtrate.

On the contrary, according to the invention, the filtering surface is fixed, so that large surfaces can be provided without difficulty and without excessive cost, all the more since the filtering wall is supported by frames which do not necessitate great construction precision (frames manufactured by a coppersmith without machining). The base 3 can readily be manufactured from concrete and this still further facilitates the provision of large apparatus. The only moving part is the mobile apparatus which is extremely simple from the mechanical view-point it is also extremely light and also it does not require great manufacturing precision, since it is not connected to any fixed part. Neither is there any difficulty in manufacturing the mobile apparatus for large-dimension plant.

The maintenance and operation of the apparatus according to the present invention are obviously simple and easy, in view of the simplicity of the mechanical elements concerned. Cleaning is also easy, since the apparatus is open everywhere and since, in order to facilitate access to the interior of the chamber 4 and the assembly of the filter cloth, dismantleable frames 5 can be provided.

Due to the precautions taken in the design of the frames 5 and 6 and to the hooding of the rinsing means 22 and 23, it is easy to obtain perfect separation of the filtrates, without any possibility of entrainment of the turbid filtrate.

into the clear filtrate. This being an indispensable condition for obtaining effective filtration.

The description given hereinabove is not limitative; there is, notably, provision for the possibility of designing in accordance with the same principle, appliances having an extremely large filtration surface comprising a multiplicity of chambers similar to chamber 4 and which are concentric and are served by the same mobile apparatus provided with the necessary number of rinsing means.

According to a further provision of the invention, apparatus is provided wherein the filtering walls are not disposed in cylindrical form but along parallel vertical planes coupled in pairs so as to form chambers containing the liquid to be filtered, the cleaning rinsers (which are still vertical) then being displaced in reciprocating movement in one plane; as can be seen in FIGURES 10 and 11.

In the apparatus illustrated in FIGURES 10 to 12, notably the filtering walls 1 and 2 are again found, as are also the chamber 4, the frames 5 and 6, the tubes 22 of the cleaning device, the first conduit 10 for the clear filtrates, the second conduit 9 for the turbid filtrates.

The apparatus shown in FIGURES 10 to 12 differs notably from that illustrated in FIGURES 1 to 7 due to the following points:

(a) Instead of being cylindrical, the filtering walls 1 and 2 are plane and the chamber 4 is of rectangular section;

(b) The cleaning device, instead of being rotary, is mounted on a carriage, 40 which is displaced on a rail 41 in reciprocating movement;

(c) The deflectors 27, 28, fast with the cleaning device 22, are replaced by fixed flaps 42 mounted about pivots 43 disposed slightly to the rear of the planes of the filtering walls 1 and 2.

With this arrangement, when the cleaning device 22 has just passed, the turbid filtrate is abundant and drops at high speed, the filtrate being deflected by the deflector 42 into the conduit 9. At the end of a certain time, the filtrate becomes clearer and its flow rate diminishes. The flaps 42 then impart to this filtrate a trajectory which is less deflected and the clear filtrate drops into the conduit 10. The flaps 42 thus permit the separation of the turbid filtrates from the clear filtrates.

It is possible to regulate the inclination of the flaps 40 by rotation about pivots 43 and thus to separate the filtrate into clear filtrates and turbid filtrates. It is also possible to provide a control connection between the level of the liquid in the chamber and the inclination of the flaps 42.

I claim:

1. Apparatus for the filtration of liquid containing solid particles in suspension, comprising: chamber means having a liquid-permeable filter wall having an inner and an outer surface; a conduit communicating with the interior of said chamber means for feeding a liquid to be filtered into the interior thereof so that a filter cake will form on the inner surface of said wall while clear liquid will pass therethrough; a compartment beneath said wall for receiving the clear liquid; cooperating rinsing and deflector means extending along a portion of said wall adjacent thereto for ejecting a cleaning fluid against the outer surface of said wall so that the fluid will pass therethrough to remove the filter cake from said portion and having a deflector element for deflecting any liquid passing adjacent said portion through said filter wall away from said compartment; moving means operatively connected to one of said aforementioned means for moving the same relative to each other so that cleaning fluid will successively be ejected against the whole outer surface of said filter wall; and means for removing filtered-out solid particles from said chamber.

2. Apparatus for the filtration of liquid containing solid particles in suspension, comprising: chamber means having a liquid-permeable filter wall having an inner and an outer surface; a conduit communicating with the interior of said chamber means for feeding a liquid to be filtered into the interior thereof so that a filter cake will form on the inner surface of said wall while clear liquid will pass therethrough; a compartment beneath said wall for receiving the clear liquid; cooperating rinsing and deflector means having an elongated narrow rinsing element extending along a portion of said wall adjacent thereto for ejecting a cleaning fluid against the outer surface of said wall so that the fluid will pass therethrough to remove the filter cake from said portion and having a deflector element wider than said rinsing element for deflecting any liquid passing adjacent said portion through said filter wall away from said compartment; moving means operatively connected to one of said aforementioned means for moving the same relative to each other so that cleaning fluid will successively be ejected against the whole outer surface of said filter wall; and means for removing filtered-out solid particles from said chamber.

3. Apparatus for the filtration of liquid containing solid particles in suspension, comprising: chamber means having a substantially vertical liquid-permeable filter wall having an inner and an outer surface and a lower edge; a conduit communicating with the interior of said chamber means for feeding a liquid to be filtered into the interior thereof so that a filter cake will form on the inner surface of said wall while clear liquid will pass therethrough; a compartment beneath said lower edge of said wall for receiving the clear liquid; cooperating rinsing and deflector means extending along a portion of said wall adjacent thereto, said rinsing and deflector means including a substantially vertical elongated narrow rinsing element spaced from said wall for ejecting a cleaning fluid against the outer surface of said wall so that the fluid will pass therethrough to remove the filter cake from said portion and a deflector element secured to said rinsing element for deflecting any liquid passing adjacent said portion through said filter wall away from said compartment, moving means operatively connected to said cooperating rinsing and deflector means for moving the same relative to said wall so that cleaning fluid will successively be ejected against the whole outer surface of said filter wall; and means for removing filtered-out solid particles from said chamber.

4. Apparatus for the filtration of liquid containing solid particles in suspension, comprising: a first liquid-permeable filter wall having an inner and an outer surface; a second generally vertical liquid-permeable filter wall parallel to said first wall and defining a fluid chamber therewith, said second wall having an inner and on outer surface and a lower edge; a conduit communicating with the interior of said chamber for feeding a liquid to be filtered thereinto so that a filter cake will form on the respective inner surfaces of said walls while clear liquid will pass therethrough; a compartment beneath said edges of said walls for receiving the clear liquid; cooperating rinsing and deflector means extending along respective portions of said walls adjacent thereto, said rinsing and deflector means including respective elongated narrow rinsing elements substantially parallel to respective ones of said walls and spaced therefrom for ejecting a cleaning fluid against the respective outer surfaces of said walls so that the fluid will pass therethrough to remove the filter cake from said portion and having a deflector element on each of said rinsing elements for deflecting any liquid passing adjacent said portion through said filter wall away from said compartment; moving means operatively connected to one of said aforementioned means for moving the same relative to each other so that cleaning fluid will successively be ejected against the whole outer surface of said filter walls; and means for removing filtered-out solid particles from said chamber.

5. Apparatus as defined in claim 4, wherein said first and second filter walls are annular and concentric and said moving means comprises respective rotatable arms disposed above said walls and carrying said rinsing elements for rotatingly moving the latter past the respective surfaces of said walls.

6. Apparatus as defined in claim 4, wherein said first and second filter walls are substantially planar and form an elongated chamber therebetween, and said moving means comprises reciprocating means for moving said rinsing elements past successive portions of said outer surfaces.

7. Apparatus as defined in claim 4, wherein said filter walls each comprise a filter diaphragm and a frame having vertical bars spaced relatively closely and horizontal bars connecting said vertical bars and spaced relatively widely, the thickness of said vertical bars being greater than the thickness of said horizontal bars and the upper edges of the latter being beveled for compelling said liquid to follow a substantially vertical path.

8. Apparatus as defined in claim 7, further comprising hood means on said rinsing and deflector means for preventing splattering of said cleaning fluid, said hood means comprising resilient wiper means projecting towards said walls and yieldingly engaging successive portions of said frame.

9. Apparatus as defined in claim 4, further comprising wall means dividing said compartment beneath said lower edges into at least a pair of channels for respectively receiving a clear liquid and a turbid liquid; said deflector elements being adapted to deflect the liquid passing through said filter walls adjacent said portions thereof and conducting said liquid into said channel for receiving said turbid liquid.

10. Apparatus as defined in claim 9, wherein the channel receiving a turbid liquid communicates with said rinsing means for recirculating said turbid liquid thereto.

11. Apparatus as defined in claim 9, wherein said deflector elements comprise respective elongated arcuate strips extending beyond said rinsing elements oppositely of the direction of movement thereof and downwardly inclined relative to said surface of said walls.

12. Apparatus as defined in claim 11, wherein said strips each include at least a pair of arcuate segments slidable relative to one another for increasing and decreasing the length of said strips.

13. Apparatus as defined in claim 11, wherein said strips include a plurality of arcuate segments successively decreasing in width oppositely of the direction of movement of said rinsing elements for successively deflecting portions of said fluids over differing paths.

14. Apparatus as defined in claim 4, wherein said rinsing elements comprise respective rinsing pipes each having a plurality of fluid nozzles longitudinally spaced therealong and directed at said walls, the spacing between consecutive ones of said nozzles being so selected as to insure substantially equal cleaning efficiency over the entire height of said portions of said walls.

15. Apparatus as defined in claim 14, wherein the lower ends of said pipes are closer to said surfaces of respective ones of said walls than the upper ends to compensate for differences in static pressure at the top and bottom of said chamber.

16. Apparatus as defined in claim 4, wherein said means for removing filtered-out solid particles from said chamber comprises a first conduit communicating with an upper portion of said chamber for withdrawing therefrom fine solid particles floating in suspension therein, and a second conduit communicating with a lower portion of said chamber for withdrawing therefrom coarse solid particles settled therein.

17. Apparatus as defined in claim 4, wherein said conduit communicates with the interior of said chamber at a point substantially halfway between the top and bottom of said chamber, and further comprising a vertically movable baffle disposed in said chamber for distributing said liquid in a substantially uniform flow.

18. Apparatus for the filtration of liquid containing solid particles in suspension, comprising: chamber means having a liquid-permeable substantially vertical filter wall with an inner and an outer surface; a conduit communicating with the interior of said chamber means for feeding a liquid to be filtered thereinto so that a filter cake will form on the inner surface of said wall while liquid will pass therethrough; at least one compartment beneath said wall for receiving said liquid; substantially vertical rinsing means extending along a portion of said wall adjacent thereto for ejecting a cleaning fluid against said outer surface so that said fluid will pass therethrough to dislodge said filter cake from said inner surface opposite said portion; a deflector element beneath the lower edge of said wall for deflecting liquid flowing downwardly along the outer surface of said filter wall in the region of said rinsing means while permitting liquid passing through said filter wall at portions spaced from said region to enter said compartment; moving means operatively connected to at least one of said means for moving the same relative to each other so that cleaning fluid will successively be ejected against the whole outer surface of said filter wall; and means for removing filtered-out solid particles from said chamber.

19. Apparatus as defined in claim 18, wherein said filter walls each comprise diaphragm means, and frame means supporting said diaphragm means and including a plurality of transversely spaced vertical strips adapted to confine a liquid passing downwardly over said outer surface to a substantially vertical path.

References Cited by the Examiner
UNITED STATES PATENTS
2,751,079   6/1956   Ahlmann _____ 209—380 X REUBEN FRIEDMAN, *Primary Examiner.*

FRANK W. LUTTER, *Examiner.*